United States Patent [19]
Förster

[11] Patent Number: 5,740,890
[45] Date of Patent: Apr. 21, 1998

[54] VIBRATION DAMPER OR SHOCK ABSORBER WITH ADJUSTABLE DAMPING FORCE ARRANGEMENT HAVING AN INTERMEDIATE TUBE

[75] Inventor: Andreas Förster, Schweinfurt, Germany

[73] Assignee: Fichtel & Sachs AG, Schweinfurt, Germany

[21] Appl. No.: 500,175

[22] Filed: Jul. 10, 1995

[30] Foreign Application Priority Data

Jul. 12, 1994 [DE] Germany ............... 44 24 433.9

[51] Int. Cl.⁶ .................................................. F16F 9/32
[52] U.S. Cl. ........................... 188/322.2; 188/322.13
[58] Field of Search ......................... 188/299, 322.19, 188/318, 315, 322.2, 322.13

[56] References Cited

U.S. PATENT DOCUMENTS 5,353,898  10/1994  Handke et al. ............... 188/294

FOREIGN PATENT DOCUMENTS 4031760   4/1992   Germany.
9206568  10/1992   Germany.
4130869   3/1993   Germany.

*Primary Examiner*—Peter M. Poon
*Attorney, Agent, or Firm*—Nils H. Ljungman and Associates

[57] ABSTRACT

Intermediate tube for a vibration damper with adjustable damping force, having a tub socket which has an overlap with a valve seat body and forms a hydraulic connection to a switchable bypass valve. Inside the tube socket there is an intermediate ring which is supported by means of a support on at least one opening side of the tube socket and has a greater axial length than the tube socket. This intermediate ring has a region forming a snap fastening to permit the intermediate tube to snap into place with a portion of the tube socket.

20 Claims, 8 Drawing Sheets

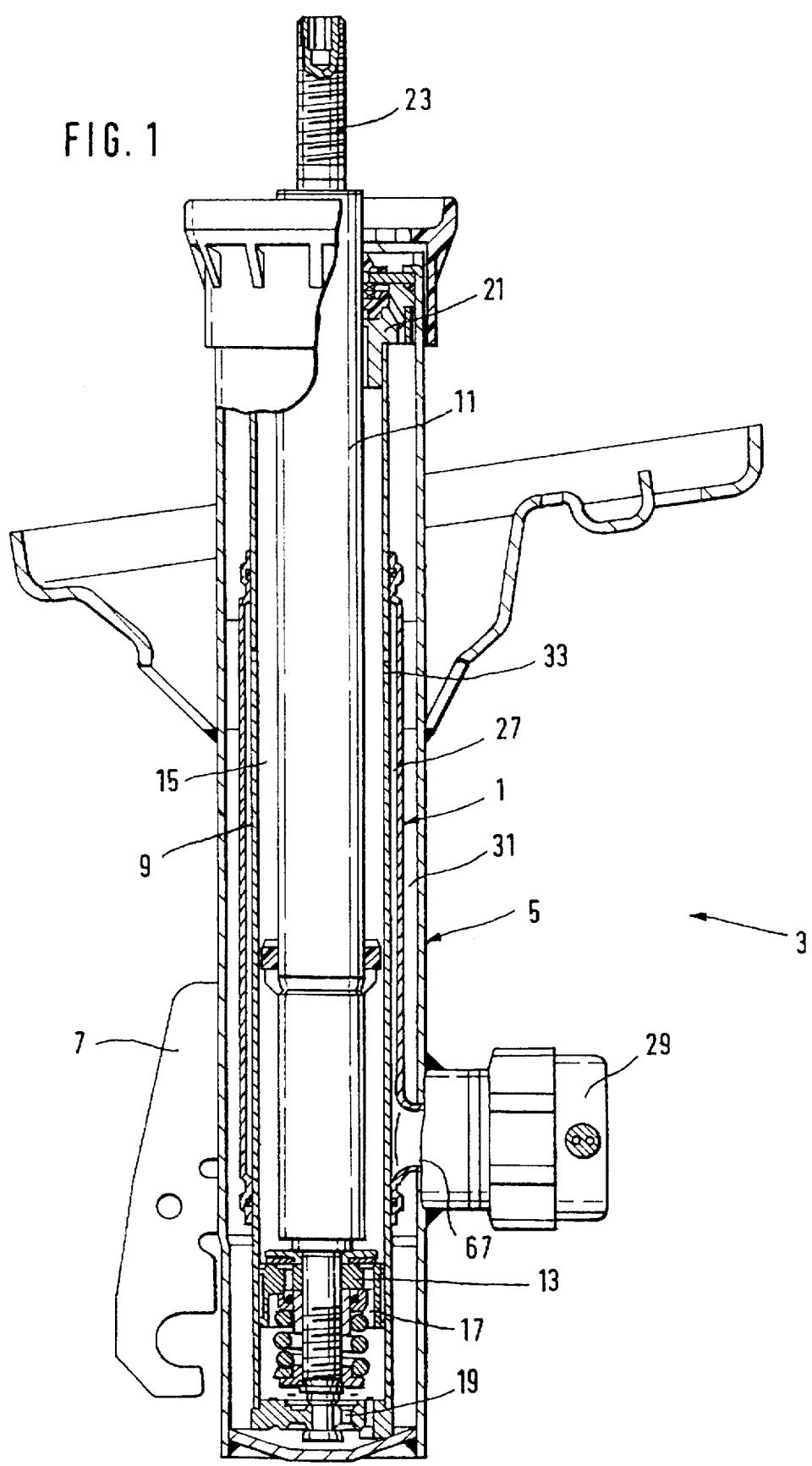

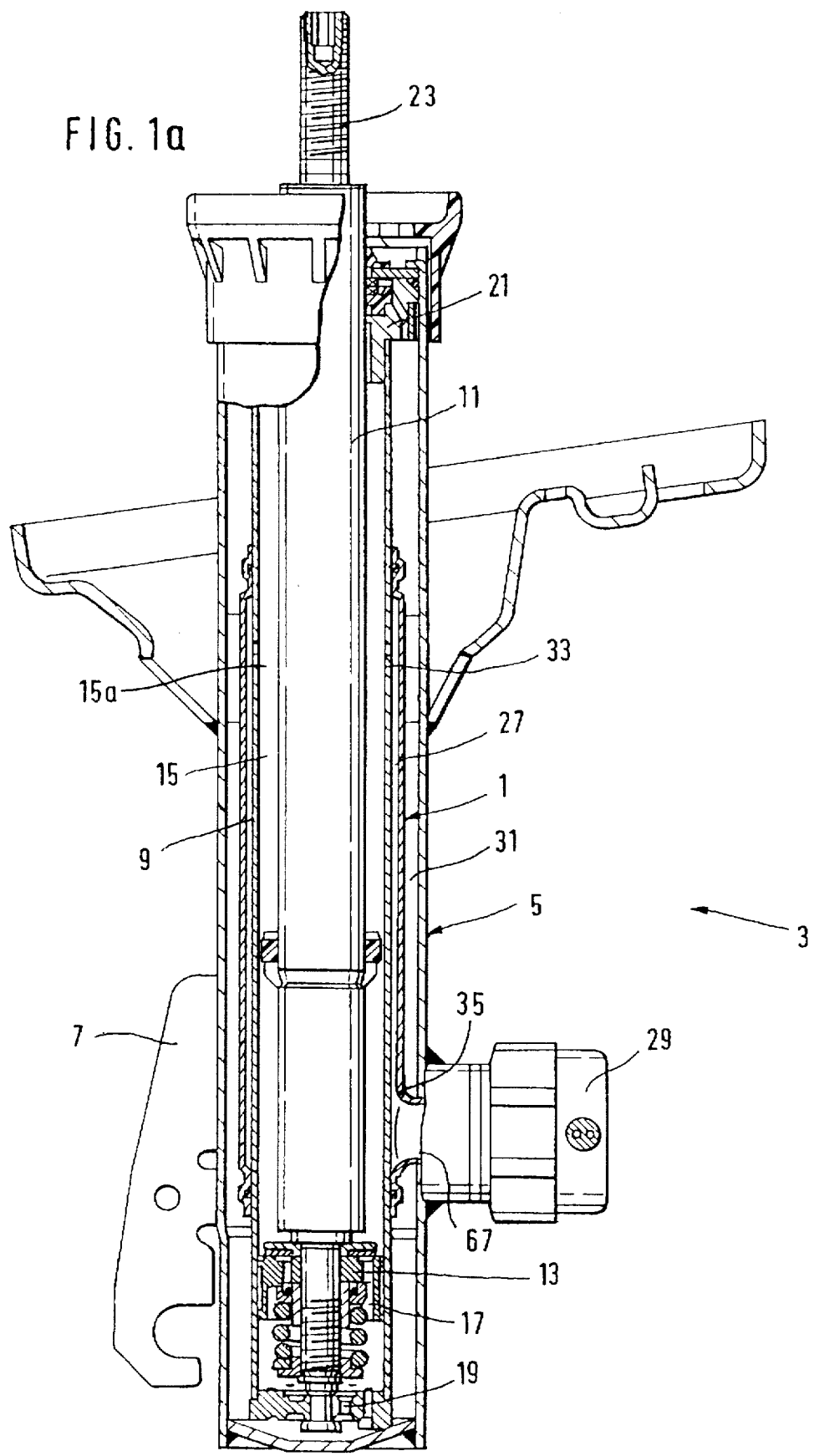

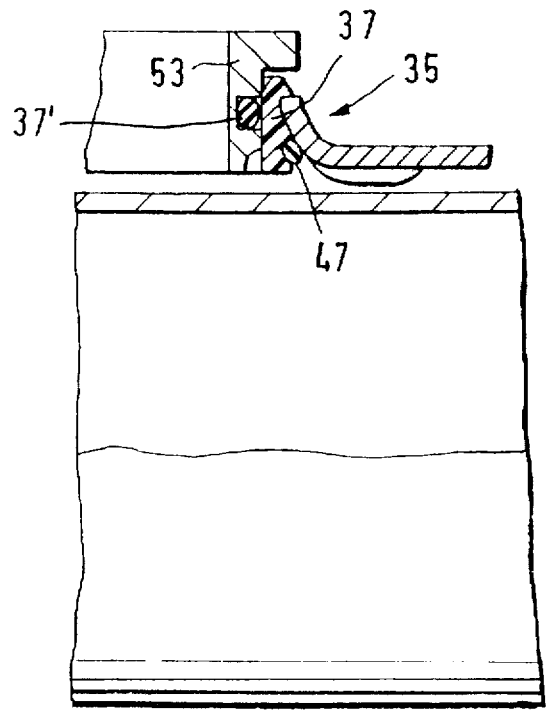
FIG. 2d
FIG. 3a
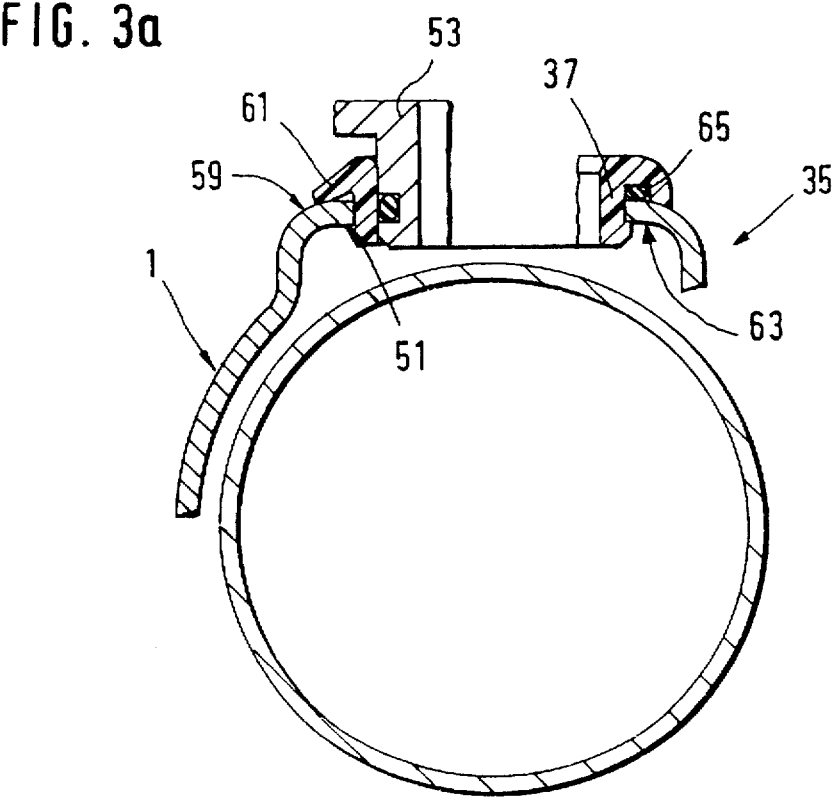

VIBRATION DAMPER OR SHOCK ABSORBER WITH ADJUSTABLE DAMPING FORCE ARRANGEMENT HAVING AN INTERMEDIATE TUBE

BACKGROUND OF THE INVENTION

1. Field of the Invention

This invention relates to a vibration damper or shock absorber with an adjustable damping force arrangement having an intermediate tube.

2. Background Information

German Utility Model Gm 92 06 568 discloses such an intermediate tube in a vibration damper. The problem with such an intermediate tube is that the tube socket must be long enough to overlap with the valve seat body of the bypass valve. One solution is to machine an undercut into the intermediate tube at the point where it makes the transition to the tube socket, thereby increasing the length of the tube socket. Nevertheless, this solution is not entirely satisfactory, since in this realization, the intermediate tube is relatively expensive, and although the length of the tube socket seems sufficient in the event of unfavorable ratios of tube socket diameter to the diameter of the intermediate tube, the load-bearing length of the overlap is still too short on account of the necessary transition radii to the tube socket. As the length of the tube socket increases, the thickness of the wall decreases, although this wall is subjected to the operating pressure inside the shock absorber.

German Laid Open Patent Application No. 40 31 760 presents an alternative in which a sealing body forms the transition between the intermediate tube and the valve seat body. The embodiments illustrated in FIGS. 1 and 2 have the disadvantage that as a result of the operating pressure in the intermediate tube, the sealing body expands, the seal with the intermediate tube is deformed, and the possibility of leaks cannot be ruled out. The variants illustrated in FIGS. 4 and 5 of German Laid Open Patent Application No. 40 31 760, disadvantageously complicate the valve seat body.

OBJECT OF THE INVENTION

The object of the present invention is to improve a vibration damper with an intermediate tube of the type described above, and to improve an intermediate tube of the type described above so that a reliable transition to the bypass valve is guaranteed, thereby achieving a cost advantage in comparison with the known arrangements.

SUMMARY OF THE INVENTION

The present invention, in accordance with at least one preferred embodiment, teaches that the above object can be achieved, if inside the tube socket, there is an intermediate ring which is supported by means of a support on at least one opening side of the tube socket and has a greater axial length than the tube socket. One of the most important advantages of the invention, in accordance with at least one preferred embodiment, is that the length of the tube socket now exerts only a secondary influence on the overlap between the intermediate tube and the valve seat body. The expense entailed in the fabrication of known tube sockets can be significantly reduced, which results in a notable cost advantage. The tube socket also performs a support function with respect to the intermediate ring, so that the latter does not leak as a result of the pressure in the intermediate tube. The intermediate ring can be replaced as an individual part, independently of the valve seat body. Thus, even vibration dampers with a rather large or a rather small distance between the intermediate tube and the container tube can be realized using the same intermediate tube. Since the number of vehicles produced with adjustable suspensions is still relatively small, the tooling costs can be kept relatively low by using the same intermediate ring for the many variations of intermediate tubes.

In accordance with an additional advantageous embodiment of the invention, the intermediate ring can preferably have at least one clamping surface with fixes the intermediate ring axially. During and before the installation of the bypass valve, the position of the intermediate ring essentially cannot change, so that a correct seating is assumed automatically and is thus guaranteed. Otherwise, an incorrect installation would only be detected, for example on a realization as illustrated in FIGS. 1 and 2 in German Patent Application No. 40 31 760, if the operation of the fully-assembled vibration damper were to be tested in a test stand.

The invention also teaches that the intermediate ring can be made of a plastic material which permits an elastic radial deformation. The intermediate ring can be snapped into the tube socket without the need for complex and expensive assembly presses or similar devices.

To reduce the amount of effort required for assembly and installation, the clamping surface of the intermediate ring preferably has a diameter which is essentially equal to that of the tube socket, but which is deformed by the valve seat body so that the clamping surfaces are engaged on the tube socket. The intermediate ring is particularly easy to introduce into the tube socket. The clamping surfaces, depending on the individual design, can be in contact with the tube socket or can be contactless. Only after the introduction of the valve seat body into the intermediate ring is there any deformation of the intermediate ring, at least in the vicinity of the clamping surfaces, which allows these clamping surfaces to perform their intended function.

In an additional advantageous embodiment the intermediate ring can have flexible tabs which are engaged on the tube socket. As a result of this measure, a controlled retaining force of the intermediate ring in the tube socket is achieved.

In known arrangements, the tube socket had to be reshaped by sizing operations, so that the overlap between the tube socket and the valve intermediate body would include a sufficient load-bearing portion. The sizing operation represents a significant manufacturing expense, and can also cause the formation of cracks. Because the tube socket is conical and the intermediate ring has an opposite conical surface which matches the shape of the tube socket, there is no longer any need for the sizing operation. The degree of deformation can be reduced in one important point.

For a favorable utilization of the available space, the intermediate ring preferably has a recess for an O-ring in the vicinity of the conical opposite surface. The damping medium essentially cannot flow around the intermediate ring, so that essentially no radial pressure forces are exerted on it which could lift the intermediate ring up away from the tube socket.

Alternatively, the intermediate ring can have an encircling bead which forms a sealing edge with respect to the tube socket. There is essentially no need for a separate seal between the tube socket and the intermediate ring. The operating pressure in the vibration damper biases the sealing edge toward the tube socket.

To facilitate assembly and installation and to guarantee a securing seating, there is preferably an assembly contour which is machined into the intermediate ring and/or into the tube socket. This contour guarantees that the intermediate spring can be introduced by applying only a slight installation force. Conceivable assembly contours include a radius or a bevel, for example.

BRIEF DESCRIPTION OF THE DRAWINGS

The invention is explained in greater detail below with reference to the embodiment illustrated in the accompanying figures, wherein:

FIG. 1 shows an overall view of a vibration damper;

FIG. 1a shows a further embodiment of FIG. 1;

FIGS. 2a, 2b, 2c, 2d, 3a, 3b, 3c, 4a, 4b, 4c, and 4d show the tube socket with the intermediate ring.

DESCRIPTION OF THE PREFERRED EMBODIMENT

Figure 2A:
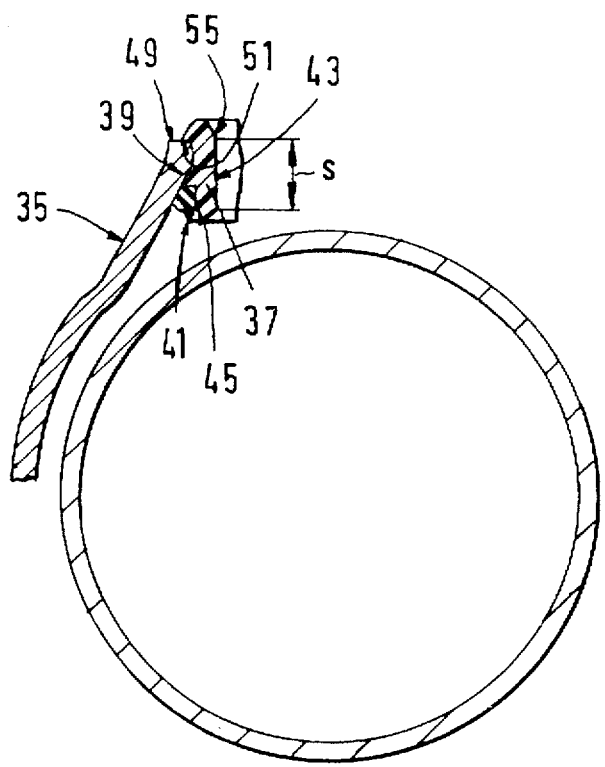

FIG. 1 shows the use of an intermediate tube 1 in a vibration damper 3 with adjustable damping, as employed by way of example in a shock absorbing strut. Located in a container 5 with a connecting mechanism 7 to a vehicle axle (not shown), there is preferably a damping unit which includes a cylinder 9 in which there is an axially-movable piston rod 11 with a piston 13 in a work chamber 15 which is filled with a damping medium, and which, as a result of the displacement of the damping medium during the movement of the piston rod, creates a damping action by means of throttle devices 17, 19.

The piston rod 11 is preferably positioned at the exit side from the cylinder 9 by means of a piston rod seal unit 21, so that it is concentric with the vibration damper 3. On the end of the piston rod 11 outside the vibration damper 3 there is preferably a connection 23 to a vehicle body (not shown). The intermediate tube 1, which is installed concentrically in the damper, together with the cylinder 9, preferably forms a connecting line 27 to a bypass valve 29.

The bypass valve 29 acts as an adjustment element for the damping and is preferably connected on the discharge side to a ring-shaped equalization chamber 31 which is located between the container 5 and the intermediate tube 1.

Preferably when there is a relative movement between the wheel and the vehicle body, the piston rod 11 moves inside the work chamber 15 and displaces some of the damping medium by means of a connecting hole 33, during which process the connecting line 27 and thus the intermediate tube 1 must be under an operating pressure.

FIG. 1a is a further illustration of the embodiment illustrated in FIG. 1. FIG. 1a shows the location of the tube socket 35, and the upper working chamber 15a.

Figure 2B:
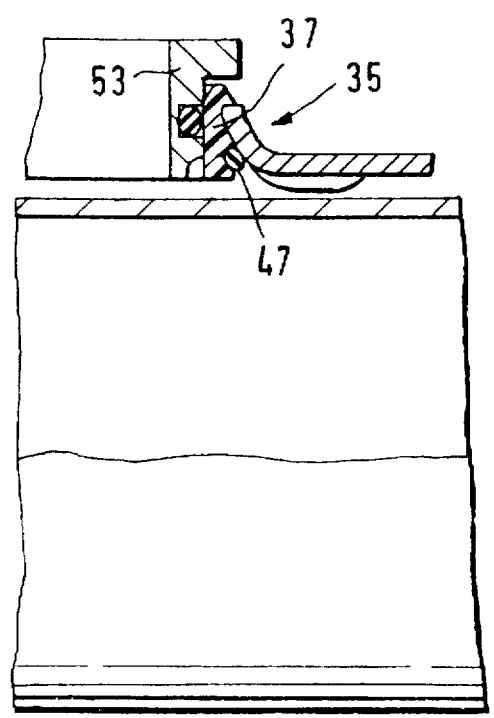

FIGS. 2a and 2b show a cross section through the intermediate tube 1 in the vicinity of a tube socket 35 as an extension of the connecting line 27. Inside the tube socket 35 there is an intermediate ring 37. The tube socket 35 is preferably realized in a slightly conical fashion, whereby the opposite surface 39 facing the tube socket 35 also has a conical shape. The opposite surface 39 thereby essentially forms the support, since the operating pressure acts on one end surface 41 and one overlapping surface 43 of the intermediate ring 37 inside the vibration damper 3, and applies a bias to the intermediate ring 37 toward the tube socket 35, but the combination of the opposite surface 39 with the tube socket 35 prevents an ejection of the intermediate ring 37. Machined into the opposite surface 39 there is preferably a recess 45 for a seal 47, so that the damping medium cannot flow around the intermediate ring 37. The seal 47 is preferably a conventional O-ring which has no curvature inside its annular plane. Engaged with an upper side 49 of the tube socket 35 is a clamping surface 51 which fixes the intermediate ring 37 axially. Overall, the axial length of the intermediate ring 37 is preferably greater than the axial length of the tube socket 35.

Preferably inserted into the intermediate ring 37 is a valve seat body 53, on the reverse side of which there is a bypass valve, which is not shown for the sake of simplicity. The length s of the intermediate ring 37 is essentially available for use as the overlap. On the end closer to the valve seat body 53, there is an insertion bevel 55 for the valve seat body 53. The intermediate ring 37 is made of a plastic material which has a certain elasticity in the radial direction. For assembly and installation, the intermediate ring 37 is preferably inserted into the tube socket 35 until the clamping surfaces 51 snap onto the upper side 49 of the tube socket 35.

Figure 2C:
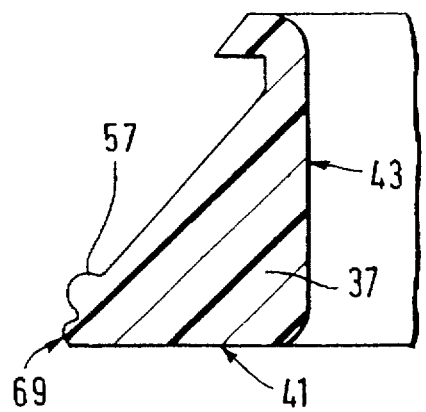

As an alternative to FIGS. 2a/b, instead of a seal 47 inside a recess 45, there can also be an encircling bead 57 as illustrated in FIG. 2c. The bead 57 is preferably brought into contact with the tube socket 35 by means of the pressure forces involved, so that there is no problem with leaks.

FIG. 2d is a further illustration of FIG. 2b. FIG. 2d illustrates elastomeric ring 37'.

Figure 3B:
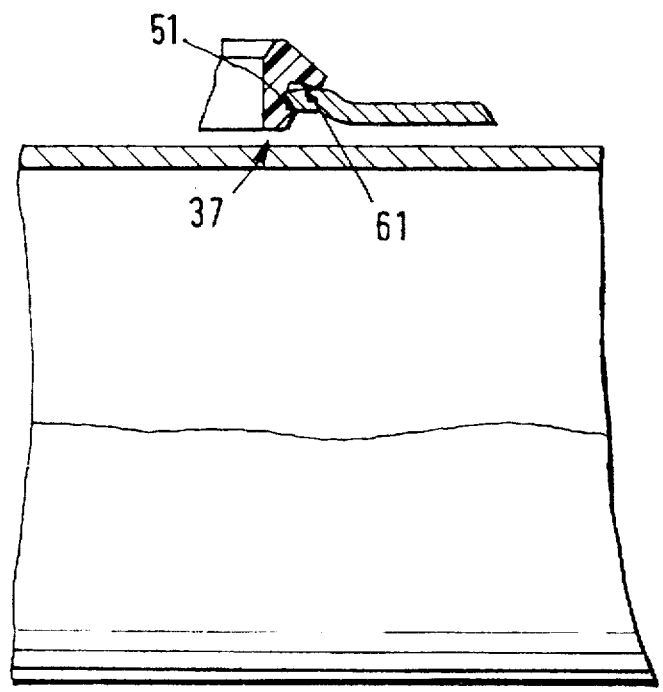

In FIGS. 3a and 3b, the tube socket 35 is realized in the shape of a dome. In this embodiment, the clamping surface 51 lies inside the intermediate tube 1. An overlap 59 of the dome 35 is preferably supported on one side by the support 61 and on the other side by the clamping surface 51. As an additional guarantee of the sealing action of the clamping surface 51 against the back side 63 of the overlap 59 of the dome to prevent leaks, a seal 65 can be enclosed between the support 61 and the overlap 59. The intermediate ring 37 can be inserted through an opening 67 of the previously installed container 5 (See FIG. 1).

Figure 3C:
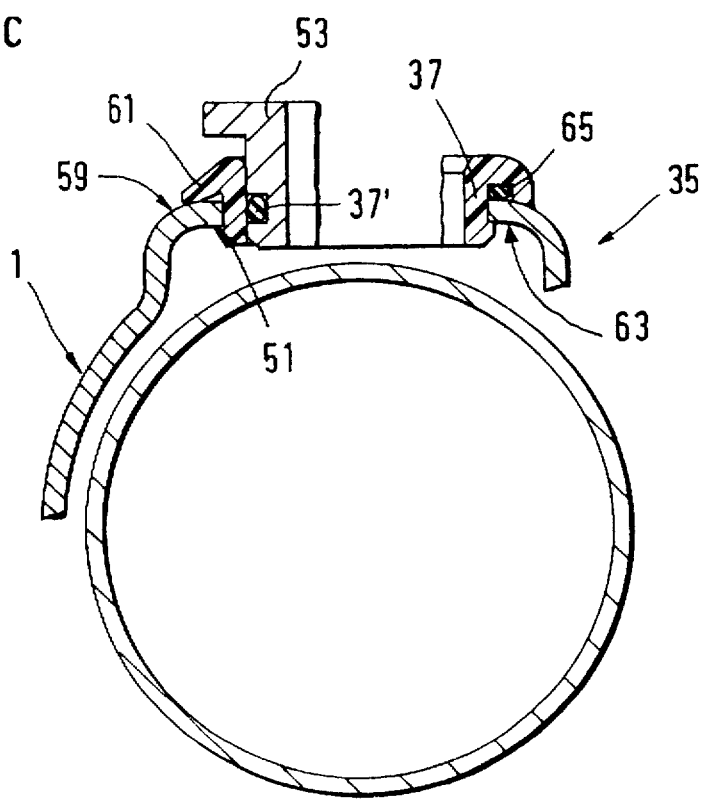

FIG. 3c is a further illustration of the embodiment illustrated in FIG. 3a. FIG. 3c further illustrates an elastomeric ring 37'.

Figure 4A:
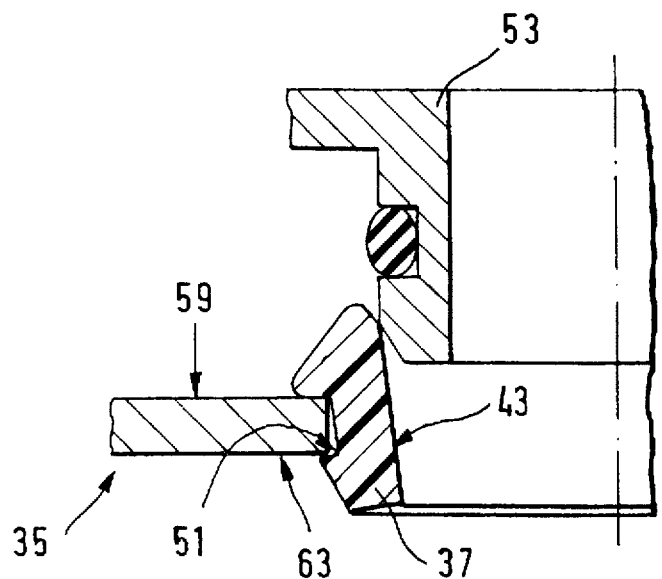

FIG. 4a illustrates one variant of an intermediate ring 37, on which the clamping surface 51 of the intermediate ring 37, before the installation of the valve seat body, just or barely surrounds the reverse side 63 of the overlap 59 of the dome 35. Only a negligible amount of force is essentially required for the installation of the intermediate ring 37. Only when the valve seat body 53 is introduced into the intermediate ring 37 is the intermediate ring 36 displaced radially outward by the valve seat body 53, whereby the greatest deformation takes place in the vicinity of the clamping surfaces 51, since that is where the greatest elasticity is. The deformation can be accomplished by a simple interference fit between the valve seat body 53 and the diameter of the overlap surface 43, or also by means of a slightly conical configuration of the overlap surface 43.

Figure 4B:
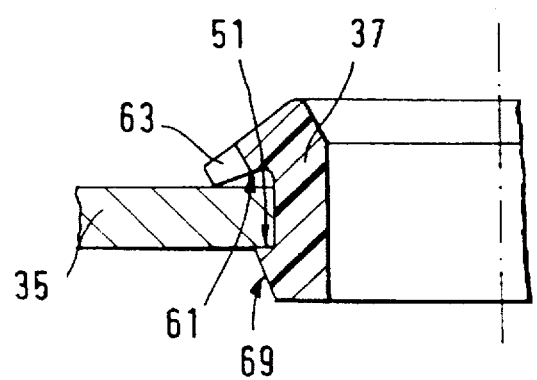

In FIG. 4b, the support 61 is provided with flexible tabs 63 which exert a bias or prestress force to define the axial position of the intermediate ring 37 which is independent of the tolerances of the material thickness of the dome 35 and of the distance between the support 61 and the clamping surface 51. To facilitate assembly and installation, there is preferably an assembly contour 69 in the form of a bevel on the intermediate ring 37. Alternatively, of course, a radius like the one illustrated in FIG. 2c can also be used.

Figure 4C:
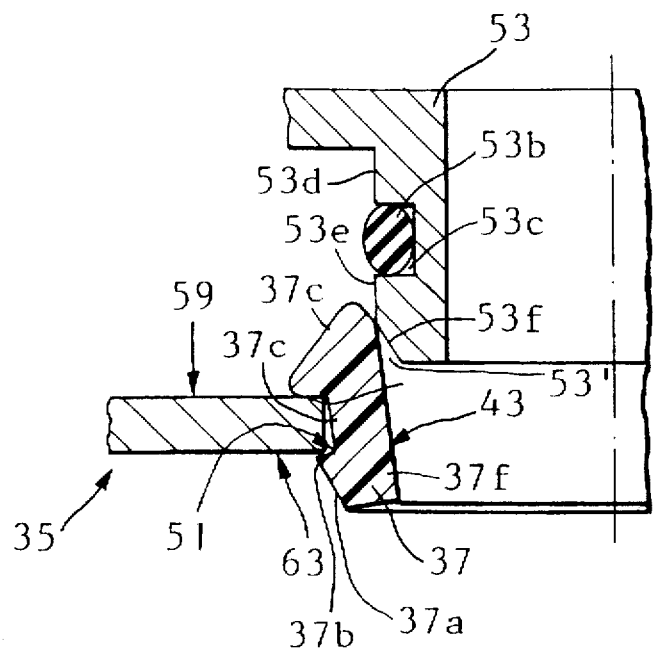

FIG. 4c illustrates one variant of an intermediate ring 37, on which the clamping surface 51 of the intermediate ring 37, before the installation of the valve seat body, just barely surrounds the reverse side 63 of the overlap 59 of the dome 35. Only a negligible amount of force is required for the installation of the intermediate ring 37. Only when the valve seat body 53 is introduced into the intermediate ring 37 is the intermediate ring 36 displaced radially outward by the valve seat body 53, whereby the greatest deformation takes place in the vicinity of the clamping surfaces 51, since that is where the greatest elasticity is. The deformation can be accomplished by a simple interference fit between the valve seat body 53 and the diameter of the overlap surface 43, or also by means of a slightly conical configuration of the overlap surface 43.

In one embodiment of the invention, a side 37a of the intermediate ring 37, extends at an angle and makes contact with the reverse side 63 of the overlap 59. Another side 37b of the intermediate ring 37, then extends away from the overlap 59 a short distance, the side then turns at about a 90 degree angle and extends further as side 37c. The side then turns again at about a 90 degree angle and extends further as side 37d. The overlap 59 extends into the space defined by the side 37b, 37c, 37d of the intermediate ring 37. The overlap 59 on the reverse side 63, just or barely extends into this area created by the sides 37b, 37c, 37d of the intermediate ring 37. Another side of the intermediate ring 37f extends at an angle essentially as overlap surface 43. The side 53f of the valve seat body 53, also extends at an angle, and between the side 37f of the intermediate ring 37 and the side 53f of the valve seat body, there is a gap 53'. In one embodiment of the present invention, an elastomeric ring 53b, fits inside a recess 53c of the valve seat body 53. On either side of the recess 53c of the valve seat body 53, there are flat surfaces 53d and 53e.

Figure 4D:
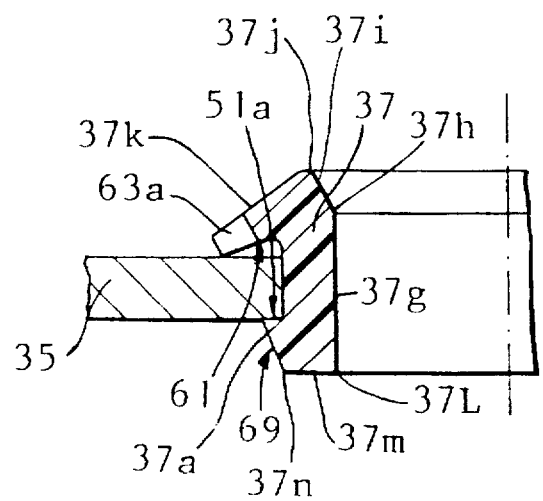

In one embodiment of the invention, as illustrated in FIG. 4d, the tabs 63a extend like fingers from the clamping surface 51a. Also, in one embodiment of the invention, a side 37g of the intermediate ring 37, extends horizontally, instead of at an angle. The side 37g of the intermediate ring 37, then turns at 37h and extends at an angle as side 37i. The side 37i of the intermediate ring 37 then turns again at corner 37j, and extends at an angle as side 37k to the tabs 63a. Opposite turn or corner 37h of the intermediate tube 37, side 37g turns at a 90 degree angle at corner 37L and extends straight out as side 37m. Side 37m then turns at corner 37n, and extends at approximately a 45 degree angle as side 37o.

It will be understood that the specific embodiments described and illustrated with respect to FIGS. 4c and 4d are provided merely as examples, and in no way are intended to limit the scope of the present invention.

The disclosure now turns to a description of a valve unit having components which may be utilized in accordance with the embodiments of the present invention. It is to be understood that components discussed here below with relation to FIG. 5 may, if appropriate, be considered to be interchangeable with similar components discussed hereabove with relation to FIGS. 1–4d.

Figure 5:
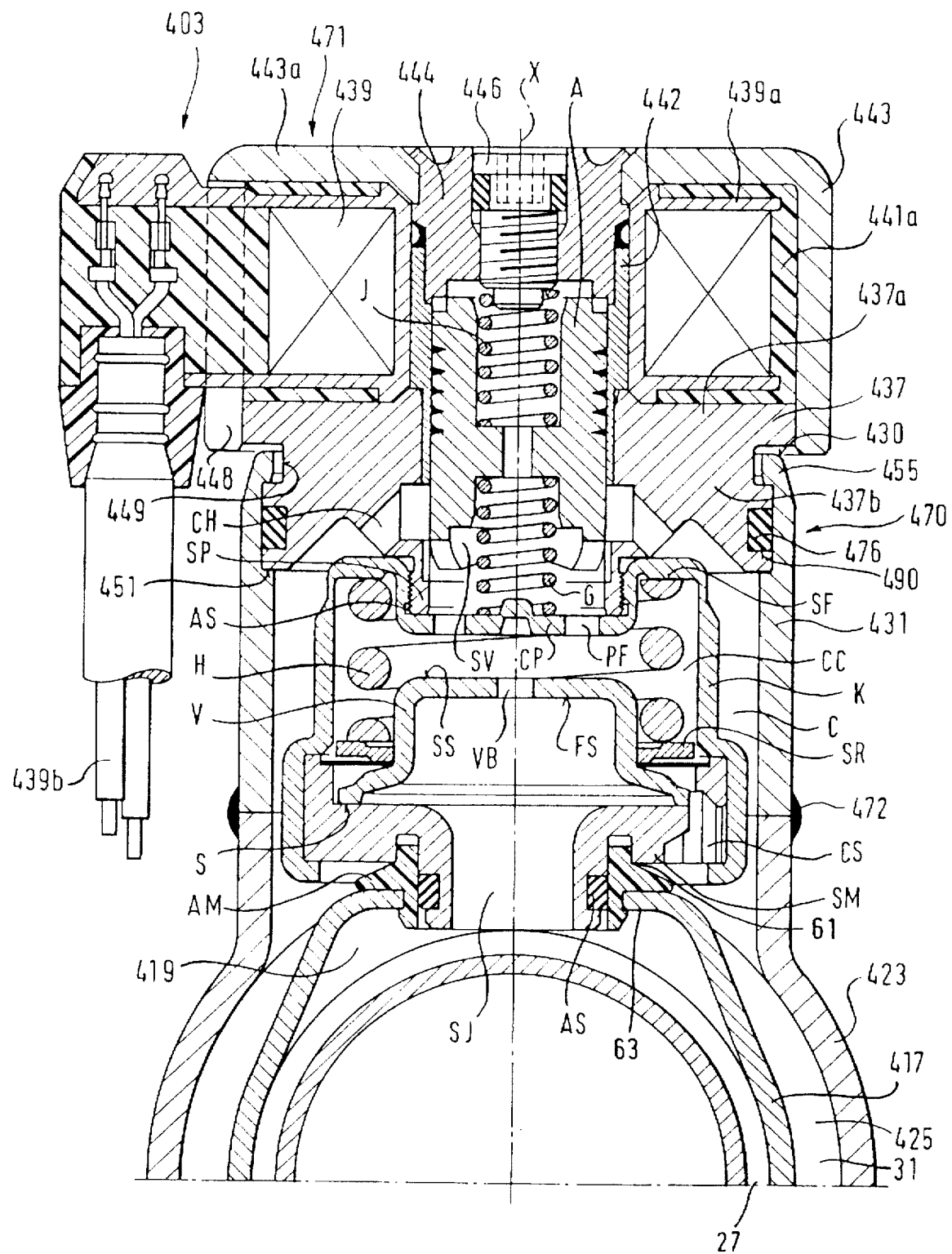
FIG. 5 shows an embodiment of a valve unit with non-releasable connection means between different housing units.

In the embodiment of FIG. 5 toroidal enveloping wall means 443, 443a, 444, 442 and 437 are provided by the jacket 443, the end wall portion 443a, the core member 444, the guide tube 442 and the intermediate wall member 437. The intermediate wall member 437 comprises a larger diameter portion 437a and a smaller diameter portion 437b. The larger diameter portion 437a is located axially between the magnetic coil 439 and an upper edge face 430 of the basic housing tube 431 which is welded at 472 to a branch portion of the container pipe 423. The small diameter portion 437b rests on the shoulder face 451. An upper end portion 455 of the basic housing tube 431 is permanently deformed radially inward such to engage into the groove 449 of the intermediate wall member 437 and as to nonreleasably connect the intermediate wall member 437 with the basic housing tube 431. A sealing ring 476 is accommodated within a groove 490 and is in sealing engagement with the basic housing tube 431. The jacket 443 is axially fixed and centered with respect to the intermediate wall member 437.

FIG. 5 also illustrates the connecting line 27, the equalization chamber 31, the support 61 and the reverse side 63 of the overlap 59 (not shown).

A further interesting aspect of the embodiment as shown in FIG. 5 is the assembly of the fluidic valve components. The hat-shaped valve member V is resting again on a valve seat S under the action of the main compression spring H. The valve seat S is provided by a valve seat member SM. This valve seat member SM is axially fixed within a cage member K. The cage member K comprises a support face SF for the upper end of the main compression spring H. The main compression spring H is prestressed between the support face SF and a support ring SR resting on the valve member V. A perforated central portion CP of the cage member K provides a support face for a further auxiliary helical compression spring G. The valve member V is provided with a throttled bore VB. The high pressure fluid path 419 is connected by an inlet bore SJ with a first side FS of the valve member V. A control chamber CC is established on the second side SS of the valve member V. The control chamber CC is connected by the throttled bore VB with the inlet bore SJ. The lower end portion of the armature A defines a secondary valve unit SV together with a downward projecting sleeve portion SP of the intermediate wall member 437. Through the secondary valve unit SV and the perforations PF of the cage member K the control chamber CC is connectable with the compartment C which compartment C is connected again with the low pressure fluid containing compensating chamber 425.

A high pressure of the fluid path 419 exists in the inlet bore SJ. This high pressure being derived from the high pressure in the upper working chamber 15a or FIG. 1a. Low pressure exists in the compartment C resulting from low pressure in the low pressure fluid containing compensating chamber 31 of FIG. 1a when the valve member V is maintained in a closing position with respect to the valve seat S below a predetermined pressure in the inlet bore SJ.

As long as the secondary valve SV is closed no damping liquid can escape through the throttled bore VB, the perforations PF and the channels CH to the compartment C and thus to the compensating chamber 425. This is true in the position of the armature A as shown in FIG. 5. When the armature A is lifted with respect to the position of FIG. 5 by energizing the electromagnetic coil 439 the secondary valve unit SV is opened and liquid can flow through the throttled bore VB, the perforations PF and the channels CH toward the compensating chamber 425.

As long as the second valve unit SV is closed the pressure of the damping liquid in the control chamber CC is the same as the pressure in the inlet bore SJ. Thus, the valve member V is maintained in engagement with the valve seat S by the main compression spring H, assuming that the liquid pressure exposed faces FS and SS are substantially equal. Preferably the lower face FS may be somewhat larger than the upper face SS. When the secondary valve unit SV is opened a secondary flow of liquid exists from the inlet bore SJ through the throttled bore VB, the perforations PF, the secondary valve unit SV and the channels CH toward the compensation chamber 425. Due to the throttling function of the throttled bore VB the pressure within the control chamber CC is reduced as compared with the pressure at the first side FS of the valve member V. As soon as a certain pressure difference exists between the inlet bore SJ and the control chamber CC the valve member V can be lifted from the valve seat S such that the main flow of damping liquid is opened through the connecting space CS from the high pressure liquid containing inlet bore SJ toward the compensating chamber 425. The opening and closing behavior of the valve member V is of high importance for the damping behavior of the oscillation damper as one can easily realize.

On the other hand the closing and opening behavior depends to a high degree on the prestress which exists in the main compression spring H when the valve member V is in closed position with respect to the valve seat S. Therefore, it is essential to exactly adjust the axial precompression of the main compression spring H depends on the axial distance between the support ring SR and the support face SF.

One feature of the invention resides broadly in the intermediate tube for a vibration damper with adjustable damping force, comprising a tube socket which has an overlap with a valve seat body and forms a hydraulic connection to a controllable valve, characterized by the fact that an intermediate ring 37 is located inside the tube socket 35, is supported at least on one opening side of the tube socket 35 by means of a support 61 and has a greater axial length than the tube socket 35.

Another feature of the invention resides broadly in the intermediate tube characterized by the fact that the intermediate ring 37 has at least one clamping surface 51 which axially fixes the intermediate ring 37.

Yet another feature of the invention resides broadly in the intermediate tube characterized by the fact that the intermediate ring 37 is made of a plastic material which makes an elastic radial deformation possible.

Still another feature of the invention resides broadly in the intermediate tube characterized by the fact that the clamping surface 51 of the intermediate ring 37 has a diameter which is essentially equal to that of the tube socket 35, but is deformed by the valve seat body 53 so that the clamping surface 51 is engaged on the tube socket 35.

A further feature of the invention resides broadly in the intermediate tube characterized by the fact that the intermediate ring 37 has flexible tabs 63 which are engaged on the tube socket 35.

Another feature of the invention resides broadly in the intermediate tube characterized by the fact that the tube socket 35 is realized in a conical fashion, and the intermediate ring 37 has a conical opposite surface 39 which matches the tube socket 35.

Yet another feature of the invention resides broadly in the intermediate tube characterized by the fact that the intermediate ring 37, in the vicinity of the conical opposite surface 39, has a recess 45 for an O-ring 47.

Still another feature of the invention resides broadly in the intermediate tube characterized by the fact that the intermediate ring 37 has an encircling bead 57 which forms a sealing edge with respect to the tube socket 35.

A further feature of the invention resides broadly in the intermediate tube characterized by the fact that an assembly contour 69 is realized on the intermediate ring 37 and on the tube socket 35.

Examples of shock absorber assemblies which may be utilized in accordance with the embodiments of the present invention may be found in the following United States Patents: U.S. Pat. No. 4,838,393, entitled "Hydro-mechanical Stop having a Restrictive Passage", which issued to Mourray et al. on Jun. 13, 1989; U.S. Pat. No. 4,817,928, entitled "Suspension System", which issued to Paton on Apr. 4, 1989; U.S. Pat. No. 4,527,674, entitled "Shock Absorber with a Hydro-mechanical Stop", which issued to Mourray on Jul. 9, 1985; U.S. Pat. No. 4,962,916, entitled "Compression Spring", which issued to Palinkas on Oct. 16, 1990; and U.S. Pat. No. 4,756,516, entitled "Resiliently Deformable Element Usable as an End Stop in a Motor Vehicle Suspension", which issued to Tondato on Jul. 12, 1988.

Examples of processes which may be utilized on accordance with the embodiments of the present invention, may be found in the following U.S. Patents: U.S. Pat. No. 5,301,414, which issued to Gautheron on Jul. 20, 1992 and U.S. Pat. No. 3,768,289 to VSI Corporation.

The components disclosed in the various publications, disclosed or incorporated by reference herein, may be used in the embodiments of the present invention, as well as, equivalents thereof.

The appended drawings in their entirely, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirely herein.

The corresponding foreign patent publication applications, namely, Federal Republic of Germany Patent Application No. P 44 24 433.9, filed on Jul. 12, 1994, having inventor Andreas Förster, and DE-OS P 44 24 433.9 and DE-PS P 44 24 433.9, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper with adjustable damping force, having an intermediate tube;
    said intermediate tube comprising a tube socket which as an overlap with a valve seat body and forms a hydraulic connection to a controllable valve, wherein an intermediate ring is located inside the tube socket, said intermediate ring being supported at least on one opening side of the tube socket by means of a support and has a greater axial length than the tube socket, and said intermediate ring comprising a region forming a snap fastening to permit said intermediate ring to snap into place with a portion of said tube socket upon said region, forming said snap fastening, passing over said portion of said tube socket.

2. A vibration damper according to claim 1, wherein said region forming a snap fastening has at least one clamping surface which axially fixes the intermediate ring.

3. A vibration damper according to claim 2, wherein the intermediate ring is made of a plastic material which makes an elastic radial deformation possible.

4. A vibration damper according to claim 3, wherein:

the clamping surface of the intermediate ring has a diameter which is essentially equal to that of the tube socket, but is deformed by the valve seat body so that the clamping surface is engaged on the tube socket; and said snap fastening comprises a preformed projection from said region to permit snapping, said projection being deformable by said portion of said tube socket to provide said snapping.

5. A vibration damper according to claim 4, wherein the intermediate ring has flexible tabs which are engaged on the tube socket.

6. A vibration damper according to claim 4, wherein the tube socket is realized in a conical fashion, and the intermediate ring has a conical opposite surface which matches the tube socket.

7. A vibration damper according to claim 6, wherein the intermediate ring, in the vicinity of the conical opposite surface, has a recess for an O-ring.

8. A vibration damper according to claim 7, wherein the intermediate ring has an encircling bead which forms a sealing edge with respect to the tube socket.

9. A vibration damper according to claim 4, wherein an assembly contour is realized on the intermediate ring and on the tube socket.

10. A vibration damper according to claim 1, wherein the intermediate ring has an encircling bead which forms a sealing edge with respect to the tube socket.

11. A vibration damper according to claim 10, wherein an assembly contour is realized on the intermediate ring and on the tube socket.

12. A vibration damper comprising:

a cylinder defining a chamber therein, said cylinder containing a damping fluid;

a piston rod sealingly projecting into said cylinder and being axially displaceable with respect to said cylinder;

a piston being attached to said piston rod, said piston being slidably disposed within said cylinder to sealingly divide said chamber into first and second chambers;

an outer tube disposed about said chamber, said piston and said piston rod;

means for permitting fluid communication between said first and second chambers;

said means for permitting fluid communication comprising damping valve means mounted at said outer tube;

said damping valve means comprising:

a valve arrangement, said valve arrangement having means for adjusting fluid communication between said first and second chambers;

means for mounting said valve arrangement with respect to said outer tube;

said vibration damper having a longitudinal axis;

an intermediate tube disposed between said cylinder and said outer tube;

said intermediate tube having a cylindrical outer surface;

said intermediate tube comprising a connection;

said connection extending substantially transverse from said cylindrical outer surface of said intermediate tube;

said connection having a longitudinal axis substantially transverse to said longitudinal axis of said vibration damper;

said connection comprising walls extending away from the longitudinal axis of said vibration damper;

said connection having an extreme end and an end adjacent said cylindrical surface of said intermediate tube;

said extreme end being disposed away from the longitudinal axis of said vibration damper;

said valve arrangement having an extension extending within the extreme end of said connection;

a ring member being disposed within said extreme end of said connection;

said valve extension being adjacent to and making contact with said ring member;

said extreme end of said connection being disposed adjacent to and making contact with said ring member;

said ring member extending beyond said extreme end of said connection; and said ring member comprising a region forming a snap fastening to permit said ring member to snap into place with said extreme end of said connection upon said region, forming said snap fastening, passing over said extreme end of said connection.

13. A vibration damper according to claim 12, wherein said ring member comprises means for supporting said ring member; and said means for supporting being engaged with said connection to support said ring member.

14. A vibration damper according to claim 13, wherein said ring member comprises a plastic material;

said plastic material is radially elastic; and said ring member being elastically deformed by at least one of said connection and said extension.

15. A vibration damper according to claim 14, wherein said means for supporting comprises:

said region forming said snap fastening; and said region forming said snap fastening comprises means for clamping said ring member onto said connection.

16. A vibration damper according to claim 15, wherein said means for clamping comprises at least one surface for clamping against at least a portion of said extreme end of said connection for holding said ring member affixed to said extreme end; and said snap fastening comprises a preformed projection from said region to permit snapping, said projection being deformable by said extreme end of said connection to provide said snapping.

17. A vibration damper according to claim 16, wherein:

said ring member has an axial length disposed substantially parallel to said longitudinal axis of said connection;

said extreme end has an axial length disposed substantially parallel to said longitudinal axis of said connection; and said axial length of said ring member being greater than said axial length of said extreme end.

18. A vibration damper according to claim 12, wherein said ring member comprises a plastic material;

said plastic material is radially elastic; and said ring member being elastically deformed radially by at least one of said connection and said extension.

19. A vibration damper according to claim 12, wherein:

said ring member has a diameter;

said connection comprises a tube socket;

said tube socket has a diameter; and said diameters of said tube socket and said ring member being similar.

20. A vibration damper according to claim 12, wherein:
said ring member has means for engaging; and
said means for engaging are engaged on said extreme end of said connection.

* * * * *

UNITED STATES PATENT AND TRADEMARK OFFICE
CERTIFICATE OF CORRECTION

PATENT NO. : 5,740,890
DATED      : April 21, 1998
INVENTOR(S): Andreas FÖRSTER

It is certified that error appears in the above-identified patent and that said Letters Patent is hereby corrected as shown below:

On the title page, item [57], line 2 under the ABSTRACT section, after 'a', delete "tub" and insert --tube--.

In column 2, line 10, after 'surface', delete "with" and insert --which--.

In column 2, line 67, before 'seating', delete "securing" and insert --secure--.

In column 8, line 53, Claim 1, after 'which', delete "as" and insert --has--.

Signed and Sealed this

Eighteenth Day of August, 1998

*Attest:*

BRUCE LEHMAN

*Attesting Officer*  *Commissioner of Patents and Trademarks*